(12) United States Patent
Bavishi et al.

(10) Patent No.: US 10,691,552 B2
(45) Date of Patent: Jun. 23, 2020

(54) DATA PROTECTION AND RECOVERY SYSTEM

(71) Applicant: International Business Machines Corporation, Armonk, NY (US)

(72) Inventors: Pankaj S. Bavishi, Pune (IN); Smita J. Raut, Pune (IN); Ramani R. Routray, San Jose, CA (US); Subhojit Roy, Pune (IN); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 14/880,317

(22) Filed: Oct. 12, 2015

(65) Prior Publication Data

US 2017/0102998 A1    Apr. 13, 2017

(51) Int. Cl.
*G06F 11/14* (2006.01)
*G06F 11/20* (2006.01)

(52) U.S. Cl.
CPC ...... *G06F 11/1464* (2013.01); *G06F 11/1469* (2013.01); *G06F 11/2028* (2013.01)

(58) Field of Classification Search
None
See application file for complete search history.

(56) References Cited

U.S. PATENT DOCUMENTS

| | | | |
|---|---|---|---|
| 7,092,867 B2 * | 8/2006 | Huang | H04L 41/22 701/1 |
| 7,992,031 B2 | 8/2011 | Chavda et al. | |
| 8,055,630 B2 | 11/2011 | Dawson et al. | |
| 8,121,966 B2 | 2/2012 | Routray et al. | |
| 8,260,754 B2 * | 9/2012 | Tatebe | G06F 11/1456 707/675 |
| 8,370,280 B1 * | 2/2013 | Lin | G06N 20/00 706/12 |
| 2003/0059303 A1 * | 3/2003 | Noussitou | B64D 31/06 416/44 |

(Continued)

OTHER PUBLICATIONS

Continuity Central, "Business Continuity Statistics: Where Myth Meets Fact," http://www.continuitycentral.com/feature0660.html, printed on Oct. 6, 2015, pp. 1-9.

*Primary Examiner* — Usmaan Saeed
*Assistant Examiner* — Yu Zhao
(74) *Attorney, Agent, or Firm* — Erik K. Johnson

(57) ABSTRACT

An embodiment of the invention may include a method, computer program product and computer system for data recovery for use with a computing device. The embodiment may determine an amount of time to transfer a first file from a first location, on a first device, to a second location, on a second device. The embodiment may include receiving historical operational information associated with the first device and the second device. The embodiment may create a transfer model correlating the amount of time to transfer the first file with the historical operational information associated with each device. The embodiment may determine an estimated amount of time to transfer a second file based on the transfer model and a current operational information about each device. The embodiment may determine whether the estimated amount of time to transfer a second file is above a first threshold amount.

20 Claims, 3 Drawing Sheets

(56) References Cited

U.S. PATENT DOCUMENTS

| | | | |
|---|---|---|---|
| 2006/0224254 A1* | 10/2006 | Rumi | G05B 13/0275 |
| | | | 700/28 |
| 2008/0282048 A1* | 11/2008 | Miura | G06F 11/1458 |
| | | | 711/162 |
| 2009/0313626 A1* | 12/2009 | Dawson | G06Q 10/06 |
| | | | 718/100 |
| 2011/0082832 A1* | 4/2011 | Vadali | G06F 11/1451 |
| | | | 707/615 |
| 2012/0023041 A1* | 1/2012 | Kariv | G06F 11/3447 |
| | | | 706/12 |
| 2014/0081919 A1* | 3/2014 | Matsumoto | G06F 11/3495 |
| | | | 707/652 |
| 2014/0344805 A1 | 11/2014 | Shu et al. | |
| 2015/0081639 A1* | 3/2015 | Jin | G06F 11/1451 |
| | | | 707/644 |

\* cited by examiner

DATA PROTECTION AND RECOVERY SYSTEM

BACKGROUND

The present invention relates to data protection and recovery, and more particularly to the estimating of time to recover following a disruptive event.

Disaster recovery (DR) is the process, policies and procedures related to preparing for recovery or continuation of technology infrastructure that are vital to an organization after a natural or human-induced disaster. Disaster recovery is essential for business continuity. As IT systems have become increasingly critical to the smooth operation of a company, the importance of ensuring the continued operation of those systems, and their rapid recovery, has increased. For example, of companies that had a major loss of business data, 43% never reopen and 29% close within two years. As a result, preparation for continuation or recovery of systems needs to be taken very seriously. This involves a significant investment of time and money with the aim of ensuring minimal losses in the event of a disruptive event.

Backup-Recovery and DR are critical aspects of a data center management operations. Typically, a significant amount of monitoring and tracking are done to achieve a higher level of service quality to ensure data is protected and it is restorable in case of a disaster.

BRIEF SUMMARY

An embodiment of the invention may include a method, computer program product and computer system for data recovery. The embodiment may include a computing device that determines an amount of time to transfer a first file from a first location to a second location. The first location is on a first device and a second location is on a second device. The embodiment may include receiving historical operational information associated with the first device and historical operational information associated with the second device. The operational information comprises one or more of: CPU usage, memory usage, and processes running. The embodiment may create a transfer model correlating the amount of time to transfer the first file from the first location to the second location with the historical operational information associated with the first device and the historical operational information associated with the second device. The embodiment may determine an estimated amount of time to transfer a second file based on the transfer model and a current operational information about the first device and a current operational information about the second device. The embodiment may determine whether the estimated amount of time to transfer a second file is above a first threshold amount.

BRIEF DESCRIPTION OF THE SEVERAL DRAWINGS

DETAILED DESCRIPTION

Disruptive events caused by natural or man-made disasters, such floods or cyber attacks, may cause catastrophic impacts on complex data systems, by destroying hardware or catastrophically removing vital information. However, complex and heterogeneous data protection environments, along with modern volatile application landscapes, make it difficult to track the success and restorability of backup operations. Multiple ways to ensure positive restorability and assess the Recovery Time Objective (RTO) are precise reporting and tracking (hard to accomplish due to complex application landscape) and actual random restore testing (hard to accomplish due to the amount of resources required and the complex skill-set expected from backup management tower). Modeling data recovery through available real-time data may result in an increased ability to predict the time to recovery from a disruptive event effecting data regimes.

Embodiments of the present invention will now be described in detail with reference to the accompanying Figures.

Figure 1:
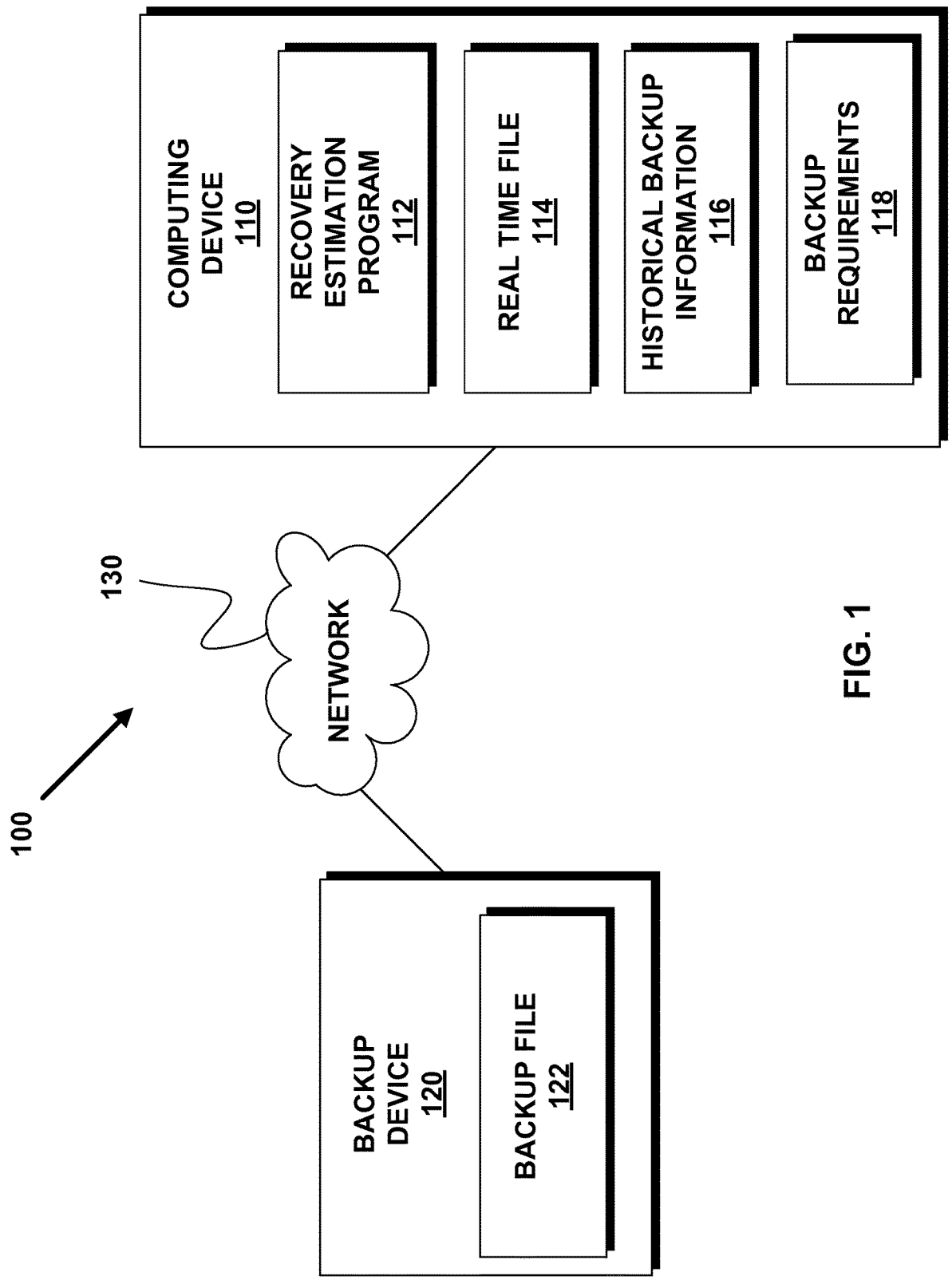
FIG. 1 illustrates a data protection and recovery system, in accordance with an embodiment of the invention.

FIG. 1 illustrates data protection and recovery system 100, in accordance with an embodiment of the invention. In an example embodiment, data protection and recovery system 100 includes a computing device 110 and a backup device 120 interconnected via a network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between the computing device 110 and the backup device 120.

Backup device 120 may include a backup file 122. Backup device 120 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, backup device 120 may be a cluster of web servers executing the same software to collectively process the requests for the web pages as distributed by a front end server and a load balancer. In an example embodiment, backup device 120 is a computing device that is optimized for the support of uploading and downloading data files which reside on backup device 120, such as backup file 122, and for the support of network requests related to such files which reside on backup device 120. Backup device 120 is described in more detail with reference to FIG. 3.

Backup file 122 includes a collection of data representing a historical snapshot of real time file 114 (explained further below), either from a single point in time (e.g. a full backup of real time file 114) or an aggregate of multiple instances in time (e.g. many partial backups of real time file 114). Backup file 122 may be stored on backup device 120, but only requires a device with sufficient memory and hard drive space to enable the storage of information on the database. Backup file 122 may be used in order to recover information lost from a real time file 114 during a disruptive event.

Computing device 110 includes recovery estimation program 112, backup requirements 118 and user interface 126.

In the example embodiment, computing device 110 is a server, a desktop computer, a notebook or a laptop computer; however, in other embodiments, computing device 110 may be a smart phone, a tablet computer, a handheld device, a thin client, or any other electronic device or computing system capable of receiving and sending data to and from backup device 120 via network 130, and capable of operating a graphical user interface. Although not shown, optionally, computing device 110 may be a cluster of web servers executing the same software to collectively process the requests for the web pages as distributed by a front end server and a load balancer. In an example embodiment, backup device 120 is a computing device that is optimized for running real time IT systems containing multiple data files, such as real time file 114. Computing device 110 is described in more detail with reference to FIG. 3.

Real time file 114 may be a data file that is being continuously updated as part of an IT regime. The data coming in may be any type of real world data, such as web data, consumer data, etc. Real time file 114 may be representative of one of many files located on computing device 110, and may contain metadata pertaining to any distinguishing characteristics of the file, such as the owner of the file, the file's client, etc. Real time file 114 may be a file stored using a collection of servers or computer devices, such as computing device 110.

Backup requirements 118 may contain information about the RTO requirements pertaining to the real time file 114, or a group of real time files 114. Specifically, backup requirements 118 details the acceptable length of time for a backup file 122 to be transferred to the computing device 110 following a disruptive event, so that backup file 122 can replace real time file 114, to minimize the impact of the disruptive event. Backup requirements 118 may be the downtime that is acceptable during operational failures (e.g. RTO requirement), or may be the acceptable rate of failure to back up a collection of files (e.g. RTO reliability). Backup requirements 118 may be stored on computing device 110.

Historical backup/recovery information 116 may contain information pertaining to the time needed to accomplish previous transfers of data from real time file 114 to backup file 122, or conversely. Historical backup/recovery information 116 may relate the time needed to transfer data due to system parameters (e.g. operational information) from previous transfers of data, such as, for example, network speed, size of backup, device load of computing device 110 and backup device 120, or any other relevant parameters. Historical backup/recovery information 116 may be stored on computing device 110.

Recovery estimation program 112 is a software application or configuration in a software application capable of estimating the time necessary to reestablish a backup file 122 as a real time file 114 following a disruptive event. Recovery estimation program 112 may accomplish this by using the data contained in historical backup/recovery information 116 to create a model. Recovery estimation program 112 may than input operational data detailing the parameters of computing device 110, backup device 120 and network 130, into the created model to estimate recovery time during the current system usage. The operations and functions of recovery estimation program 112 are described in further detail below with regard to FIG. 2.

Figure 2:
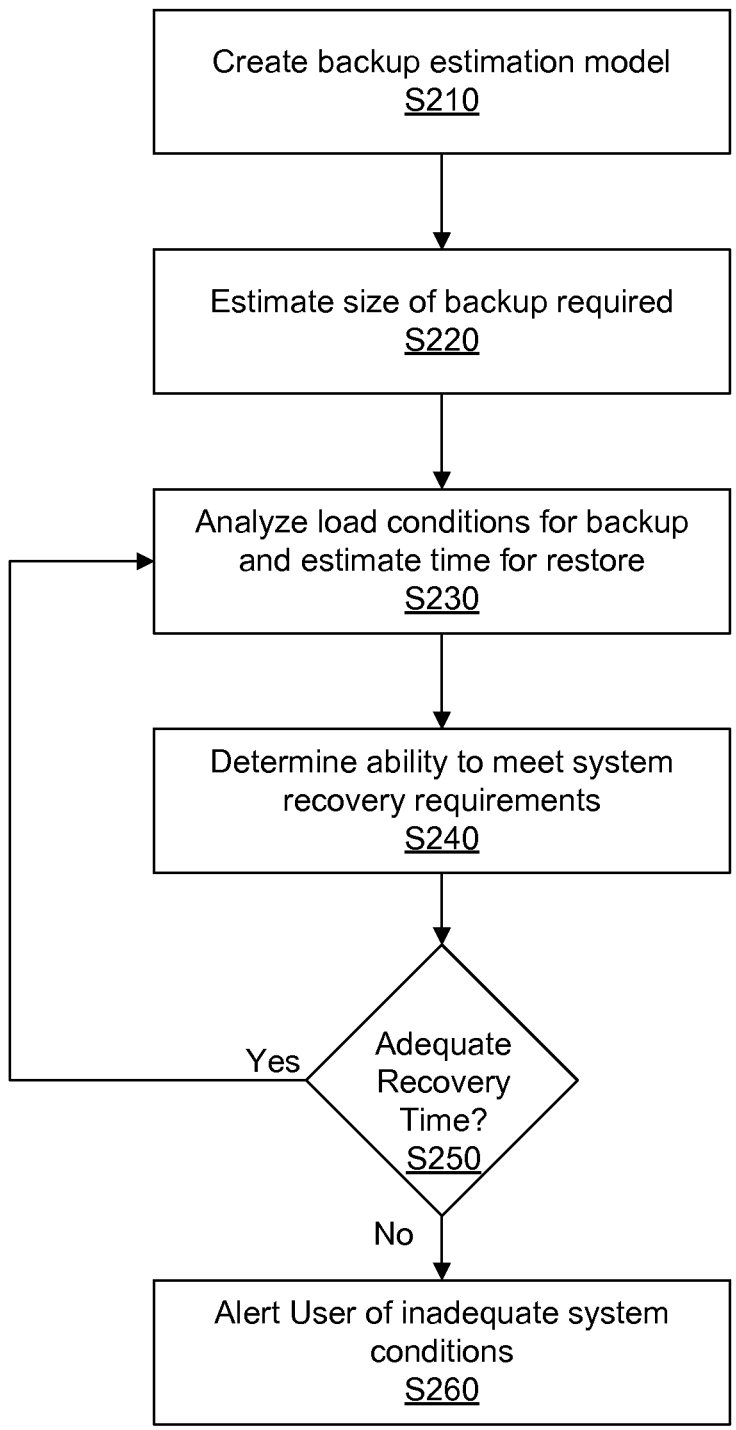
FIG. 2 is a flowchart illustrating the operations of the recovery estimation program of FIG. 1 in determining what document to display based on a shortcut input, in accordance with an embodiment of the invention.

FIG. 2 is a flow chart illustrating the steps of the estimation recovery program 112, in accordance with an embodiment of the invention.

Referring to step S210, recovery estimation program 112 creates a backup estimation model using the historical backup/recovery information 116. In an example embodiment, the backup or recovery jobs may be characterized by job size (1), network speed (2), device load (3) of computing device 110 and backup device 120 (e.g. concurrent back jobs on the same device), and completion time (4). In the example embodiment, a modeling method, such as a linear regression model, may create a function having a formula $(4)=f((1), (2), (3))$; where the completion time (4) is the dependent variable; and job size (1), network speed (2), device load (3) are the independent variables. Device load, or operational parameters, may refer to parameters characterizing the performance of a device such as, for example, CPU usage, free memory, processes running, I/O component performance, service status, configuration data, or any other relevant parameters, or how much each of the above parameters are used for the backup or recovery of the current job. Such a model may use information from backup jobs, recovery jobs, or both to create the models. The model may take into account a granular (or partial) restore that has occurred. Such instances of a granular restore may occur when a portion of the real time file 114 has been lost, and the files need to be restored from the backup file 122. When creating the model, the information may be appropriately weighted based on differences between backup and restore. For example, recovery estimation program 112 may determine any systematic differences for an individual device (or type of device) between upload and download of files, and incorporate the systematic difference into the model by weighting the historical data to account for such systematic differences when creating the model. Further, the model may take into account information (such as job size, network speed, device load and completion time) about data recoveries from backup device 120 to devices similar to computing device 110. The model created by recovery estimation program 112 can estimate the restore recovery time given the size of the file, network connection and current load of the devices computing device 110 and backup device 120 during the backup of real time file 114, and additionally may use similar types of information from a granular restoration of real time file 114.

Referring to step S220, the recovery estimation program 112 will use the backup specific configurations of real time file 114, in order to determine the estimated backup recovery size. For example, if the real time file 114 is configured to have daily full backup, then the estimated backup recovery size for the backup would be the size of the previous backup job size. In another example, if the backup is configured to have weekly full backup using daily increments, or a granular backup, (e.g. daily partial backups of $1/7^{th}$ the size), the estimated backup recovery size for the backup would the total of the last 7 daily backups, plus the amount of any day-to-day incremental increase.

Referring to step S230, the recovery estimation program 112 may estimate the approximate recovery time following a hypothetical disruptive event. The recovery estimation program 112 determines the load of computing device 110, backup device 120 and current network 130 based on the current operating conditions, and uses the estimated backup recovery size from S220, to apply the model created by the recovery estimation program 112 in step S210, to obtain an estimated recovery time for real time file 114. Such evaluation process can be triggered periodically (e.g., every 15 min), or on-demand. Such processes may occur for multiple real time files 114 located on a computing device 110, or may be performed based on attributes of the real time files 114 (e.g. client, size, owner).

Referring to step S240, the recovery estimation program 112 will compile the estimated recovery time for a given backup given the current operating parameters and compare the estimated recovery time to the backup requirement 118 to determine an RTO reliability. The RTO reliability may be a statistical analysis detailing how often restoring the backup file 122 as real time file 114 would not conform to the backup requirements 118 for the specified file. The RTO reliability may relate to a period of time (e.g. last month, last year), or may be based on operational criterion (e.g. network load). For example, if RTO reliability is to be calculated based on the prior week, step S230 of recovery estimation program 112 may be run 100 times, and may meet the RTO requirements 90 times during the week, based on the operating conditions at the time the model estimates the recovery time, then the RTO reliability would be 90%. In such an example, step S240 may compile average, median, and distribution of the estimated recovery time based on the week of estimated recovery time based on operating conditions.

Referring to decision S250, the recovery estimation program 112 may determine if the RTO reliability for a specific file, or set of files, is adequate. This may be based on requirements of a specific file (e.g. must maintain RTO 98% of the time for a file), or may be based on objectives for multiple, similar, files (e.g. all files from a certain client must meet 95% RTO). If adequate recovery time is determined, recovery estimation program 112 returns to step S230 to continue estimating backup time based on the load conditions, checking the estimated recovery time against RTOs. If there is not adequate recovery time, recovery estimation program 112 proceeds to step S260.

Referring to step S260, the recovery estimation program 112 may alert a user about the inability to meet the defined RTOs contained in backup requirements 118. The recovery estimation program 112 may provide statistics of when RTOs are not met. For example, recovery estimation program 112 may alert the user that in 80% of instances of inadequate recovery time, the amount of processor power allocated to recovery was less than 20%. Additionally, the recovery estimation program 112 may provide possible improvement solutions based on system parameters that are more likely to lead to inadequate recovery time. For example, if the recovery estimation program 112 identifies that more than 60% of the instances of inadequate recovery time are due to inadequate performance of the network 130, a recommendation may be provided detailing the need to improve network performance.

Figure 3:
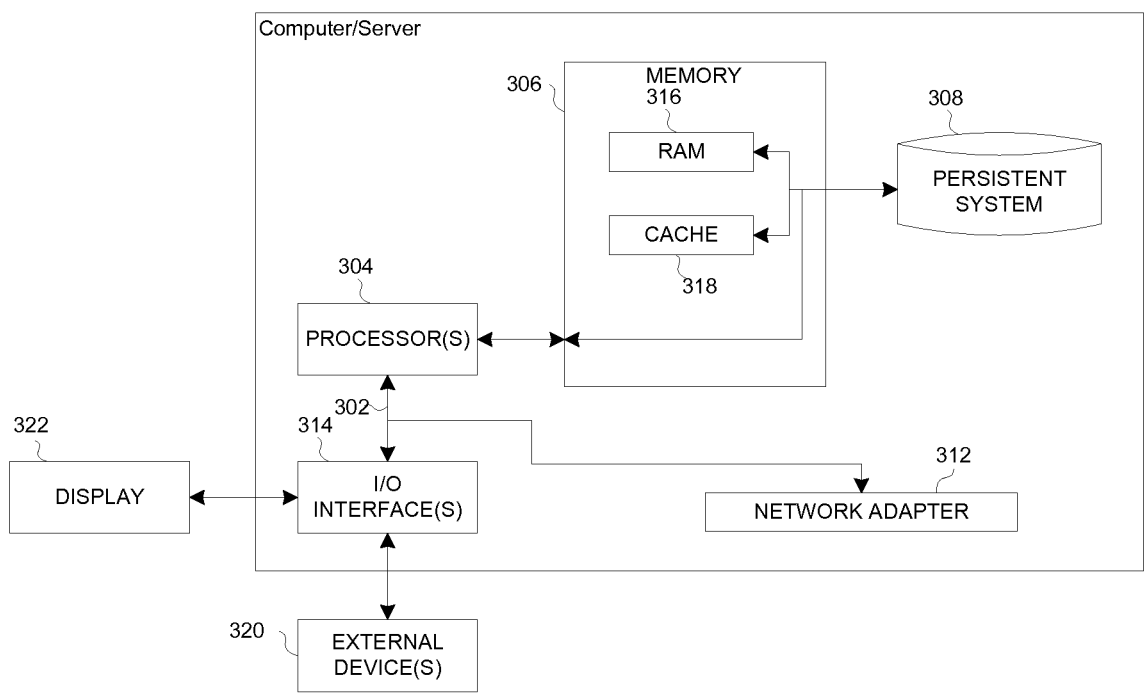
FIG. 3 is a block diagram depicting the hardware components of the computing device and backup device of FIG. 1, in accordance with an embodiment of the invention.

FIG. 3 depicts a block diagram of components of computing device 110 and backup device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and backup device 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs recovery estimation program 112, real time file 114, historical backup/recovery information 116 and backup requirements 118 in computing device 110; and backup file 122 in backup device 120 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The recovery estimation program 112, real time file 114, historical backup/recovery information 116 and backup requirements 118 in computing device 110; and backup file 122 in backup device 120 may be downloaded to persistent storage 308 through communications unit 312.

I/O interface(s) 314 allows for input and output of data with other devices that may be connected to computing device 110 and social media backup device 120. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the recovery estimation program 112, real time file 114, historical backup/recovery information 116 and backup requirements 118 in computing device 110; and backup file 122 in backup device 120, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method of data recovery, the method comprising:
   determining an amount of time to transfer a first file from a first location to a second location, wherein the first location is on a first device and a second location is on a second device;
   receiving historical operational information associated with the first device and historical operational information associated with the second device, wherein operational information comprises information detailing processor usage, information detailing memory allocation, and information detailing one or more operated processes;
   creating a transfer model correlating the amount of time to transfer the first file from the first location to the second location based on the historical operational information associated with the first device and the historical operational information associated with the second device, wherein the transfer model is a linear regression model relating historical information for transfer time to historical information for file size, historical information for network speed between the first location and the second location, and historical information for operational information;
   determining a reliability of the system to meet backup requirements of transferring from the first location to the second location, wherein the backup requirements are stored on the first device and include an acceptable length of time for a backup file to be transferred, an acceptable amount of downtime for a computing device during an operational failure, and an acceptable rate of failure to back up a collection of files, and wherein the reliability of the system is determined based on periodically:
   determining, for the first device and the second device, systematic differences between uploading and downloading files and incorporating the systematic differences in the transfer model;
   determining an estimated amount of time to transfer a second file based on the transfer model, size of the second file, current operational information about the first device, and current operational information about the second device; and
   determining the reliability of the system based on the percentage of time the estimated amount of time to transfer the second file is above a first threshold amount; and
   based on the reliability of the system being below a threshold percentage, providing improvement solutions.

2. The method of claim 1, wherein the historical operational information associated the first device and the historical operational information associated with the second device comprise data associated with one or more of a full restore and a granular restore.

3. The method of claim 1, wherein the historical operational information associated with the first device and the historical operational information associated with the second device comprise data associated with one or more of a full backup and a granular backup.

4. The method of claim 1, further comprising:
   receiving historical operational information about a network connection between the first device and the second device; and
   creating the transfer model further correlating the amount of time to transfer the first file from the first location to the second location with the historical operational information associated with the network connection.

5. The method of claim 1, wherein determining the estimated amount of time to transfer a second file based on the transfer model and the current operational information is performed at a set interval.

6. The method of claim 5, further comprising determining a frequency that the estimated amount of time to transfer a second file is above the first threshold amount.

7. The method of claim 6, further comprising alerting a user if the frequency that the estimated amount of time to transfer a second file is above the first threshold amount is above a second threshold value.

8. A computer program product for data recovery, the computer program product comprising:
   one or more non-transitory computer-readable storage devices and program instructions stored on at least one of the one or more non-transitory computer-readable storage devices, the program instructions comprising:
   program instructions to determine an amount of time to transfer a first file from a first location to a second location, wherein the first location is on a first device and a second location is on a second device;
   program instructions to receive historical operational information associated with the first device and historical operational information associated with the second device, wherein operational information comprises information detailing processor usage, information detailing memory allocation, and information detailing one or more operated processes;
   program instructions to create a transfer model correlating the amount of time to transfer the first file from the first location to the second location based on the historical operational information associated with the first device and the historical operational information associated with the second device, wherein the transfer model is a linear regression model relating historical information for transfer time to historical information for file size, historical information for network speed between the first location and the second location, and historical information for operational information;
   program instructions to determine a reliability of the system to meet backup requirements of transferring from the first location to the second location, wherein the backup requirements are stored on the first device and include an acceptable length of time for a backup file to be transferred, an acceptable amount of downtime for a computing device during an operational failure, and an acceptable rate of failure to back up a collection of files, and wherein the reliability of the system is determined based on periodically determining, for the first device and the second device, systematic differences between uploading and downloading files and incorporating the systematic differences in the transfer model;

determining an estimated amount of time to transfer a second file based on the transfer model, size of the second file, current operational information about the first device, and current operational information about the second device; and determining the reliability of the system based on the percentage of time the estimated amount of time to transfer a second file is above a first threshold amount; and based on the reliability of the system being below a threshold percentage, providing improvement solutions.

9. The computer program product of claim 8, wherein the historical operational information associated the first device and the historical operational information associated with the second device comprise data associated with one or more of a full restore and a granular restore.

10. The computer program product of claim 8, wherein the historical operational information associated with the first device and the historical operational information associated with the second device comprise data associated with one or more of a full backup and a granular backup.

11. The computer program product of claim 8, further comprising:

program instructions to receive historical operational information about a network connection between the first device and the second device; and program instructions to create the transfer model further correlating the amount of time to transfer the first file from the first location to the second location with the historical operational information associated with the network connection.

12. The computer program product of claim 8, wherein program instructions to determine the estimated amount of time to transfer a second file based on the transfer model and the current operational information is performed at a set interval.

13. The computer program product of claim 12, further comprising program instructions to determine a frequency that the estimated amount of time to transfer a second file is above the first threshold amount.

14. The computer program product of claim 13, further comprising program instructions to alert a user if the frequency that the estimated amount of time to transfer a second file is above the first threshold amount is above a second threshold value.

15. A computer system for data recovery, the computer system comprising:

one or more processors, one or more computer-readable memories, one or more non-transitory computer-readable storage devices, and program instructions stored on at least one of the one or more non-transitory computer-readable storage devices for execution by at least one of the one or more processors via at least one of the one or more memories, the program instructions comprising:

program instructions to determine an amount of time to transfer a first file from a first location to a second location, wherein the first location is on a first device and a second location is on a second device;

program instructions to receive historical operational information associated with the first device and historical operational information associated with the second device, wherein operational information comprises one or more of: information detailing processor usage, information detailing memory allocation, and information detailing one or more operated processes;

program instructions to create a transfer model correlating the amount of time to transfer the first file from the first location to the second location with the historical operational information associated with the first device and the historical operational information associated with the second device, wherein the transfer model is a linear regression model relating historical information for transfer time to historical information for file size, historical information for network speed between the first location and the second location, and historical information for operational information;

program instructions to determine a reliability of the system to meet backup requirements of transferring from the first location to the second location, wherein the backup requirements are stored on the first device and include an acceptable length of time for a backup file to be transferred, an acceptable amount of downtime for a computing device during an operational failure, and an acceptable rate of failure to back up a collection of files, and wherein the reliability of the system is determined based on periodically determining, for the first device and the second device, systematic differences between uploading and downloading files and incorporating the systematic differences in the transfer model;

determining an estimated amount of time to transfer a second file based on the transfer model, size of the second file, current operational information about the first device, and current operational information about the second device; and determining the reliability of the system based on the percentage of time the estimated amount of time to transfer a second file is above a first threshold amount; and based on the reliability of the system being below a threshold percentage, providing improvement solutions.

16. The computer system of claim 15, wherein the historical operational information associated the first device and the historical operational information associated with the second device comprise data associated with one or more of a full restore and a granular restore.

17. The computer system of claim 15, wherein the historical operational information associated with the first device and the historical operational information associated with the second device comprise data associated with one or more of a full backup and a granular backup.

18. The computer system of claim 15, further comprising:
program instructions to receive historical operational information about a network connection between the first device and the second device; and
program instructions to create the transfer model further correlating the amount of time to transfer the first file from the first location to the second location with the historical operational information associated with the network connection.

19. The computer system of claim 15, wherein program instructions to determine the estimated amount of time to transfer a second file based on the transfer model and the current operational information is performed at a set interval.

20. The computer system of claim 19, further comprising program instructions to determine a frequency that the estimated amount of time to transfer a second file is above the first threshold amount.

* * * * *